May 14, 1929.  E. GUSTAFSON  1,712,956
SPEEDOMETER DRIVE ADAPTER
Filed June 7, 1926  2 Sheets-Sheet 1
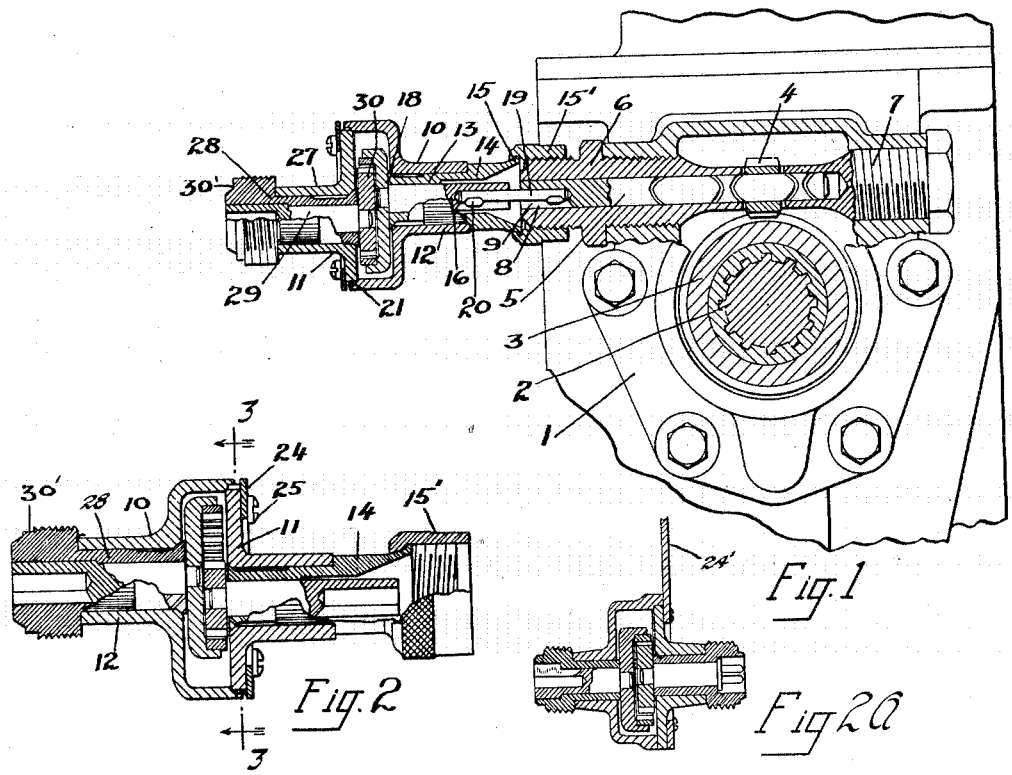
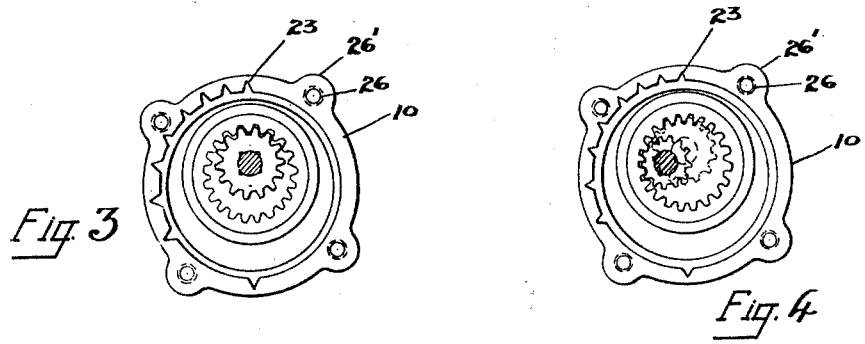
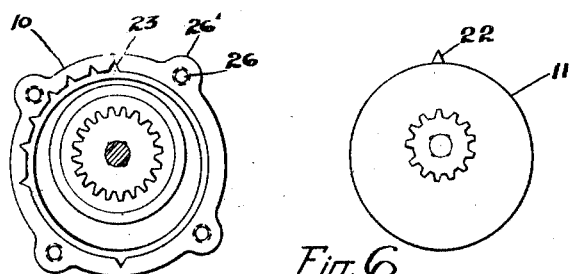
Inventor
EDWIN GUSTAFSON
By Blackmore, Spencer & Hulin,
Attorneys.

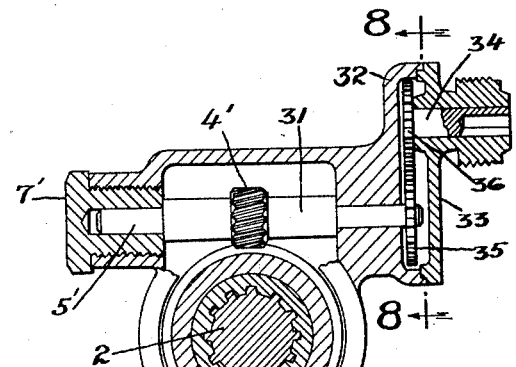
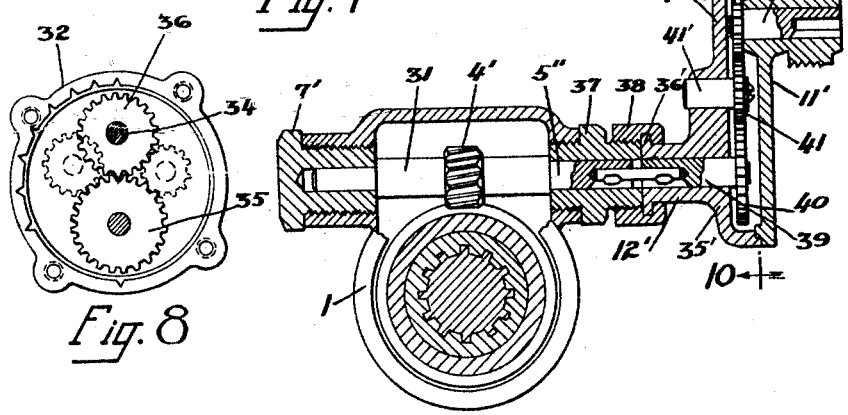
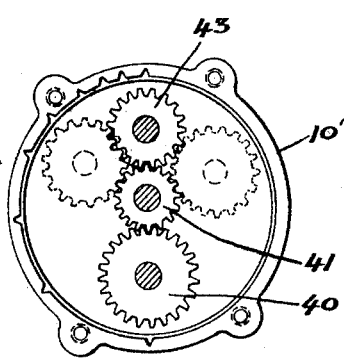
Inventor
EDWIN GUSTAFSON

Patented May 14, 1929.

1,712,956

UNITED STATES PATENT OFFICE.

EDWIN GUSTAFSON, OF FLINT, MICHIGAN, ASSIGNOR TO A C SPARK PLUG COMPANY, OF FLINT, MICHIGAN, A COMPANY OF MICHIGAN.

SPEEDOMETER-DRIVE ADAPTER.

Application filed June 7, 1926. Serial No. 114,263.

This invention relates to mechanism intended for connecting the conventional flexible speedometer shaft with a vehicle transmission, although its utility is obviously not restricted to this single field of usefulness. In driving such a shaft it is customary to provide a gear connection with the transmission shaft. It frequently happens that the gear ratio between the transmission shaft and the speedometer shaft must be corrected, owing to changes which have been made in the sizes of tires or changes in the gear ratio at the ring gear. In the case of some trucks, several different sizes of tires are optional as are also a number of differing gear ratios. To accommodate these various differences it has been necessary to provide a number of so-called adapters for connecting the speedometer shaft with the transmission in order to give under all circumstances correct speed and distance readings.

It is an object of this invention to provide a single adapter capable of use with a wide range of rear end driving ratios and tire sizes. This is accomplished by associating with one gear in the adapter, a plurality of other gears any one of which may be used by the correct positioning of its support or carrier. A further object consists in doubling the number of ratios by making the shafts (drive and driven) inter-changeable, whereby for every step-up ratio there is an equivalent step-down ratio.

The invention will be understood by reading the following specification together with the accompanying drawing. In the drawing, Figure 1 represents a vertical view of the take-off device with the adapter attached thereto. Figure 2 is a longitudinal section of the adapter removed from its connection with the transmission casing and with its shafts interchanged.

Figure 2ª illustrates a modified form in section.

Figure 3 is a vertical section through the adapter on line 3—3 of Figure 2 showing the engagement of the internal gear and pinion.

Figure 4 is a similar view showing in dotted lines a representation like that in Figure 3 and in full lines the engagement of a second pinion with the internal gear.

Figure 5 is an end view facing the open end of the casing.

Figure 6 is a similar view of a cooperating casing cover, showing the eccentric position of the pinion. Figure 7 is a transverse section of modified form using spur gearing.

Figure 8 is a vertical section on line 8—8 of Figure 7, showing the adaptability of the mechanism for use of the several gears of different sizes.

Figure 9 is a view like that of Figure 7 showing a still further modification.

Figure 10 is a section on line 10—10 on Figure 9, illustrating the interchangeability of gearing to effect changes in gear ratios.

Referring to the drawing and particularly to the Figures 1 to 6, numeral 1 represents a vehicle transmission casing from which is shown projecting a shaft 2. For driving the speedometer this shaft is provided with a worm 3 in driving engagement with the worm gear 4 on the intermediate part of the shaft 5. This shaft 5 passes through an apertured and flanged sleeve 6 threaded into the transmission casing, its flange engaging the wall of the casing. The end of the shaft 5 is received in a recess of a plug 7, also threaded into the casing and in alignment with sleeve 6. An external thread is cut on the outer end of sleeve 6 for attachment with the adapter. The end of shaft 5 is centrally bored as at 8 and communicating therewith is a radial slot 9 for a purpose to be explained.

The adapter comprises a casing member 10 and a closure or cover plate 11. The casing 10 is cup shaped and projecting from the bottom of the cup in an eccentric position is a tubular part 12. Pressed into the tubular part 12 and entering the bottom of the casing is a sleeve 13 having a flange 14 engaging the end of the tubular extension, and an outer end flange 15. This end flange holds in position an internally threaded nut 15' designed for engagement with the threaded end of sleeve 6. Passing through sleeve 13 and journalled therein is a shaft 16. The end of shaft 16 within the cup shaped casing has fitted upon a reduced part thereof a ring gear 18. The other end of shaft 16 is bored and slotted as in the case of shaft 5. A connecting member 19 is provided with lugs 20. This member 19 enters the apertures bored in the ends of shaft 5 and 16, the lugs entering the slots to effect driving relation between shafts 5 and 16. This connection makes a very convenient way of connecting and disconnecting the shafts when the adapter is attached or removed.

Cooperating with the cup shaped casing is the cover plate 11. This plate 11 rests on an annular shoulder 21 provided within the cup, and on its circular periphery is a projection 22 insertible into any one of the plurality of notches 23 cut into the edge of the cup above the shoulder. A ring 24 overlies the junction of casing and cover and by a plurality of fastening means 25 secures the casing and cover together there being openings in the ring and aligned threaded openings 26 in bosses 26' of the casing for the accommodation of the fastening means. Extending eccentrically from the cover plate is a tubular extension 27 and within the same is pressed a sleeve 28 serving as a journal for a shaft 29. At its outer end the sleeve is enlarged and threaded as at 30' for attachment to the end of the casing of the flexible speedometer shaft. The shaft 29 within the sleeve 28 has at its outer end the same bored and slotted arrangement described above for its connection with the speedometer shaft. At its inner end within the cup the shaft 29 carries gear 30 engaged with the ring gear 18.

By reference to Figure 2 it will be seen that a reverse arrangement has been made. The pinion and gear have been removed from their respective shafts, and the sleeves carrying the shafts have been pressed out of the casing and cover and interchanged. The gear and pinion have been replaced and the casing and cover assembled. By thus interchanging the parts and with no addition of elements a change of gear ratio has been effected, one being a step-up the other a step-down, each to the same extent.

In place of the pinion 30 may readily be substituted any one of a group of pinions of varying diameters. As the center of the pinion shaft travels in a circle about the common center of the casing and its cover when the cover and casing are relatively rotated (see Figure 2), and owing to the fact that each of the shafts is mounted eccentrically a plurality of relative adjustments of cover and casing will correspond to the use of the several pinions with the internal gear. An inspection of Figures 3 and 4 will explain this adjustment of gear ratios. The dotted line pinion in Figure 4 corresponds to the pinion shown in Figure 3. The full line representation shows the cover and casing as having been relatively rotated. The cross hatched shaft carrying the pinion has been carried about the axis of the casing as a center to a new position. In this new position a smaller pinion has been substituted for engagement with the internal gear. Provision is made for eight pinions accommodated by eight different adjustments of casing and cover. Eight gear ratios are thus obtained by use of our adapter and eight pinions. The number of gear ratios is doubled by the interchange of shafts as explained above. Moreover the flexible speedometer shaft may be directly connected to shaft 5' without the inter-position of the adapter thus securing a total of seventeen possible gear ratios with a single adapter and its seven extra pinions. It will be understood of course this number is not necessary, for a smaller or larger number of ratios may be made use of.

Figure 2ª illustrates a form of the invention intended for use within the length of the flexible drive means. In this form instead of using part 13 a duplicate of part 28 is employed. The two parts 28 are used one in the cup 10 and the other in the cover 11. By this means there is provided a threaded member 30' at each side of the adapter. The plate 24 of Figure 2 is modified to make it serve not only as the fastening means for parts 10 and 11 but as a supporting means. To that end it is extended as at 24' and the extension may be supported upon any convenient part as a frame member. The part 30', as stated above, is adapted for attachment to the flexible speedometer shaft housing. When the adapter is located mid-length the speedometer drive shaft its adjacent ends are secured to the two threaded members 30'. In other respects this modification in no way differs from the form of invention already described.

Figures 7 and 8 show the adaptation of the invention to spur gears. In these figures, shaft 5' is driven by the shaft 2. A shaft 5' is carried in an opening in a plug 7' and in a passageway bored in the casing in alignment with the opening in the plug. Sleeves 31 are located within the casing around the shaft 5' in abutment with the opposite sides of the worm gear 4' and the casing wall and plug respectively. The gear casing is formed to constitute an auxiliary housing 32 within which the end of shaft 5' projects eccentrically. The cover 33 carries journalled therein, also eccentrically, a shaft 34 for engagement with the speedometer shaft, the same connecting means being used as before described. This shaft passes through a boss in the cover threaded for engagement with the casing of the flexible speedometer shaft. Within the housing is a spur gear 35 on shaft 5' engaging a spur pinion 36 on shaft 34. A plurality of notches on the housing 32 and a projection on cover 33 permit the relative rotation of cover and housing as in the form previously described. A plurality of pinions are attachable to shaft 34 in place of pinion 36, one to mesh with gear 35 in each of the positions of adjustment. These arrangements are shown in Figure 8 whereby one full line showing and by two dotted line disclosures three gear ratios are illustrated.

Figures 9 and 10 illustrate another form in which the invention may be embodied. In this modification the gear casing 1 is provided with an apertured plug 7' and a sleeve 37 similar to sleeve 6 of Figure 1. The spacing sleeves 31 are made use of as in Figure 7 between the worm gear 4' and the plug and sleeve respectively. Shaft 5'' has the apertured and slotted end for the connecting means described above and the sleeve 37 has an external thread for connection with the modified adapter indicated in general by numeral 35'. The adapter comprises a casing 10' and a cover 11'. The casing has an eccentric tubular part 12' having an external flange 36' for a nut 38 which is to be threaded on sleeve 37 to secure the adapter to the gear casing. Journalled in the part 12' is the shaft 39 connected to shaft 5'' by the connecting means described above. Within the casing 10' and secured to shaft 5'' is a spur gear 40. The casing carries also an idler 41 rotatably mounted on stub shaft 41. It will be observed from Figure 10 that the axis of shaft 41' is mounted off the center of the casing so that the idler is eccentric as was described in the case of the driving elements in the other forms of the invention. The cover 11' carries journalled therein and through an eccentric tubular sleeve projecting therefrom a shaft 42. Pinion 43 is mounted on the inner end of shaft 42 within the casing and meshes with idler 41. Provision is made for the relative rotation of casing and cover, and for securing these parts by means of a projection and notches as previously described. For each of the several positions of adjustment a pinion is provided as a substitute for pinion 43, the change being designed to effect the desired gear ratio, and made possible by the eccentricity of the driving gear and idler as will be readily understood. The advantage of this third form lies in the fact that the direction of rotation of the driven shaft 42 is the same as that of shaft 5'' owing to the use of the idler, whereas in Figure 7 the direction of rotation is reversed.

The form shown by Figures 1 to 6 I regard as preferable in that it does not reverse the direction of rotation and because this direction is maintained without the use of the third idler gear. However it is obvious that there may be circumstances where the simpler form of Figure 7 may be preferred and where also it may be desired to use the added idler to secure the same direction of rotation rather than employ the internal gear. In each form I have an expedient wherein it is merely necessary to provide several pinions as substitutes for the driven pinion in order to secure correct speed and distance readings with the variable sizes of tires and variable rear end driving gear ratios. The preferred form has the added advantage of interchangeability of shafts to thereby double the ratios. Furthermore the adapter is made with connections whereby it may be connected by means similar to the means connecting the speedometer casing. Very convenient means is thus obtained for inserting and removing the unit. Upon its removal it is possible to connect the speedometer shaft directly.

I claim:

1. A transmission adapter consisting of a casing, a concentric cover, one of said parts having a lug and the other a plurality of recesses for inter-engagement at a plurality of adjusted positions, and each having a fixed external eccentrically positioned attaching sleeve, shafts extended through said sleeves and gearing for connecting said shafts in driving relation.

2. In an adapter unit, a cup shaped casing having a fixedly positioned eccentric sleeve, a concentric cover therefor having a fixed eccentric sleeve, shafts in said sleeves, gearing between said shafts, a radial lug on said cover engageable with any one of a plurality of recesses on said casing whereby the casing and cover may be circumferentially adjusted to permit substitution of gearing elements on said eccentric shafts.

3. In an adapter for transmission devices, a cup shaped casing having an eccentric sleeve, a tubular shaft carrying member having securing means mounted in said sleeve, a cooperating cover having an eccentric sleeve, a tubular shaft carrying member in said sleeve, means to secure the casing and cover together in circumferentially adjusted positions, the arrangement permitting interchange of tubular shaft carrying sleeves; and also gear substitution by a relative circumferential adjustment of casing and cover.

4. An adapter for transmission devices comprising a casing having an eccentric opening therein, a concentric cover having an eccentric opening therein, shafts rotatably mounted in said openings, gearing within said casing between said shafts, cooperating inter-engaging means on said casing and cover whereby the casing and cover may be circumferentially adjusted to a plurality of predetermined positions to permit substitution of gear elements and a change in the driving ratios between the shafts.

In testimony whereof I affix my signature.

EDWIN GUSTAFSON.